Patented Nov. 3, 1936

2,059,948

UNITED STATES PATENT OFFICE 2,059,948

COATING COMPOSITIONS

Harold S. Holt, Wilmington, Del., assignor to E. I. du Pont de Nemours & Company, Wilmington, Del., a corporation of Delaware No Drawing. Application April 6, 1934, Serial No. 719,409

3 Claims. (Cl. 134—26)

This invention relates to coating compositions, and more particularly to a finish for automobile deck materials.

Coating compositions designed for application on weathered automobile deck materials have been sold to the trade for some time under the name of top dressings or top renewers. These finishes are designed to restore the original appearance of automobile decks which have become unsightly due to checking, chalking, and loss of gloss, and are not to be confused with the finishes applied to the deck material at the factory at the time the deck is manufactured. Top renewer compositions sold to the trade vary widely in composition, some being pigmented drying oils, while others contain asphalt as the main ingredient. Still others are pigmented pyroxylin lacquers or compositions containing wax. These finishes must be capable of being applied with a brush and cannot be baked as is done with many finishes applied at the factory. The compositions heretofore used as dressings for weathered automobile tops have usually been minor variations of compositions used for other purposes and well known to the art.

It has been proposed to use compositions containing oil modified polyhydric alcohol-polybasic acid resins as renewers for automobile deck material inasmuch as these compositions exhibit unusual gloss retention when applied over weathered automobile top material. Such compositions, however, have not been practical as top renewers for the reason that they tend to develop deep cracking on exposure. In cases where the top material is a rubber coated fabric, such as is commonly used, these cracks may penetrate into the rubber compound and thus afford a passage for water and sunlight. The result is a top which soon leaks and rots.

This invention has as an object new and useful coating compositions. A further object is the preparation of a finish for weathered automobile tops which possesses unusual luster retention, freedom from cracking and chalking, good drying properties and is easily applied with a brush. Other objects will appear hereinafter.

These objects are accomplished by compounding a coating composition from ingredients comprising an oil acid modified, or an oil acid-rosin modified polyhydric alcohol-polybasic acid resin, a suitable solvent, an organic iron salt, and an oxide of lead.

I have found that the disadvantages of the resinous compositions mentioned above may be overcome by adding to the polyhydric alcohol-polybasic acid resin composition an organic iron salt, particularly the iron salts of the higher fatty acids, and an oxide of lead such as litharge.

In carrying out my invention the oil modified resin, defined herein as a polyhydric alcohol-polybasic acid resin synthesized in the presence of fatty oil acids or fatty oils, is dissolved in a suitable solvent and the iron salt and oxide of lead incorporated into the composition. The oxide of lead is incorporated by grinding or mechanical incorporation as contrasted with heating (the method usually used for incorporating this substance in drying oils or resins) because in the practice of the present invention chemical combination of the oxide with the fatty oil acids is not desired. The iron salt is incorporated by blending either hot or cold with the polyhydric alcohol-polybasic acid resin. The mixture after being ground in a ball mill for 24–48 hours is ready for use.

The following example illustrates the preferred method for practicing my invention.

Example

| | Parts by weight |
|---|---|
| Resin A | 37.00 |
| Carbon black | 1.47 |
| Litharge | 1.10 |
| Ferrous oleate | 2.95 |
| Thinner (xylene) | 57.48 |
| | 100.00 |

The litharge, ferrous oleate and carbon black are added to the solution of the resin in the thinner and the resulting mixture is ground in a ball mill for 24–48 hours or until the carbon black is thoroughly dispersed in the vehicle.

Carbon black is added mainly for the color it imparts. The carbon black content of the finish may be varied over a wide range, depending on the gloss and the intensity of color desired. It is even possible to omit the carbon black entirely, although the appearance of the finish suffers if this is done. In general, a ratio of from 0.5 to 10%, based on the weight of resin is most desirable. The amount of litharge is limited by the amount of carbon black used, the lower limit being about 1% based on the weight of resin, and the upper limit of litharge being the quantity which imparts a muddy cast to the color of the film. The preferred ratio is about 3% based on the weight of the resin. The ratio of iron salt may be varied over a wide range, the upper limit being the point at which the toughness and drying properties of the film are adversely affected.

The lower limit is the amount needed to prevent cracking of the film during exposure. In general, amounts varying from 5–20% based on the amount of resin are most desirable.

Although the ratio of ingredients may be varied over a fairly wide range, it is not possible to omit any of the ingredients except carbon black if maximum durability of the finish is to be obtained. Furthermore, it is not possible to substitute salts of other metals commonly used as driers such as the linoleates or resinates of lead, manganese, or cobalt for the iron salts since these materials do not prevent cracking. Likewise, the oxides of other metals such as manganese dioxide, zinc oxide, titanium dioxide, etc. do not produce the effects obtained with the oxides of lead. The effectiveness of iron salts in combination with the oxides of lead in finishes of this type is not due to a combination of lead and iron as oxidation catalysts since a mixture of lead resinate and iron resinate would not produce the same effect.

The resins most useful in the practice of my invention are the oil modified resins made by the simultaneous reaction of polyhydric alcohol, polybasic acid and oil acids of drying, semi-drying, or non-drying oils. If the fatty oil itself is used for making the resins the oil, unless it is an hydroxylated oil such as castor oil, should be first heat treated with the glycerol, or other polyhydric alcohol, and the resulting mono- and diglycerides reacted with the polybasic acid. The method for making the resin used in the foregoing example and for making similar resins of this type is as follows:

*Resin A.—Oil acid modified*

| | |
|---|---|
| Phthalic anhydride | 26.66 |
| Glycerol | 16.97 |
| Linseed oil acids | 42.05 |
| China wood oil acids | 14.32 |
| | 100.00 |

This resin is prepared by mixing the above ingredients in the proportions given, raising the temperature of the mixture to 250° C. in one hour and holding at 250° C. until the acid number drops to a value of approximately 5.

*Resin B.—Oil acid modified*

| | |
|---|---|
| Phthalic anhydride | 42.79 |
| Glycerol | 21.82 |
| Cottonseed oil fatty acids | 35.39 |
| | 100.00 |

This resin is prepared by heating the mixed ingredients to a temperature of 225° C. in one hour and holding the temperature at 225° C. until the acid number drops to a value of 23–25. Carbon dioxide may be blown through the mixture during heating.

*Resin C.—Oil acid-rosin modified*

| | |
|---|---|
| Fumaric acid | 7.53 |
| Adipic acid | 7.83 |
| Rosin | 40.00 |
| Linseed oil acids | 30.86 |
| Glycerol | 13.78 |
| | 100.00 |

This resin is prepared by mixing the ingredients in the proportions shown, after which the mixture is heated to 200° C. in one hour. The temperature is maintained at 200° C. until an acid number of approximately 50 is reached.

Polyhydric alcohols and polybasic acids usually used in the manufacture of polyhydric alcohol-polybasic acid resins may be used in making the resins for my improved compositions. Thus, glycerol may be replaced, for example, by ethylene glycol, diethylene glycol, sorbitol or pentaerythritol, and the phthalic anhydride may be replaced by such acids as fumaric, adipic, and succinic acids.

A high ratio of linseed oil to China wood oil is desirable, the purpose of the China wood oil being to improve drying properties, while the linseed oil imparts good luster retention properties. Semi-drying or non-drying oils or fats or the free fatty acids derived from them as, for example, oleic acid, stearic acid, cottonseed oil acids, coconut oil acids, etc., may be substituted for linseed oil acids and China wood oil acids in resins of this type. Rosin and natural resin acids are modifying ingredients which may advantageously be included with the fatty oil or fatty oil acid modifying agent. The most effective iron salts are the salts of the higher fatty acids, in particular the oleate and laurate, although it is possible to obtain good results with other organic iron salts such as the linoleate and resinate. Litharge is the most effective oxide of lead, but red lead or lead dioxide may also be used. Suitable thinners are toluene and xylene, turpentine, gasoline, or mixtures of these materials. A small amount of alcohol is sometimes desirable and ester solvents such as butyl acetate, may be used as partial substitutes for the aromatic hydrocarbons or turpentine.

While the separate contributions of the different ingredients to the effectiveness of my composition are perhaps not completely ascertainable, it appears that the iron salt not only prevents cracking but also protects the film from the effects of sunlight which otherwise causes a diminution in luster. The accelerating action of the iron salts on the drying of the film is also important. The oxide of lead when intimately mixed or dispersed in the composition may be considered as a pigment which contributes durability as well as improvement in initial drying time.

The product of this invention is substantially free from the several disadvantages such as low order of durability as compared to the durability of the original finish, loss of gloss and tendency to chalk and crack which leaves the top in worse condition than it was before application of the renewer. An outstanding feature of my improved composition is the remarkable retention of luster upon exposure, being comparable in this respect to the luster retention of the original finish applied at the factory. Service tests have shown retention of a major portion of the original luster for periods varying from six months to a year after application, whereas the best of the prior art top renewers lose their gloss after three or four months.

A further advantage of my finish is that it may be applied over any of the different types of automobile decks now in use such as rubberized fabrics, pyroxylin coated fabrics, or pyroxylin coated fabrics finished with a drying oil composition. In addition to renewing the appearance of the weathered deck, these finishes afford protection by waterproofing and sunproofing. In addition there are the advantages of rapid drying (3–4 hours to the tack-free stage), ease of application with a brush, and good leveling properties which results in a finish free from streaks and brush-marks.

As many apparently different embodiments of this inventon may be made without departing from the spirit and scope thereof, it is to be understood that I do not limit myself to the specific embodiments thereof except as defined in the following claims.

I claim:

1. A composition comprising volatile solvent, an intimate mixture of polyhydric alcohol-polybasic acid resin modified by from 35% to 75% of monobasic acid including linseed oil acids and China wood oil acids with the linseed oil acids in excess of the China wood oil acids, carbon black in amount of from ½% to 10% of the resin, an iron drier in amount of from 5% to 20% of the resin, and an oxide of lead in amount not less than about 1% of the resin calculated as litharge but less than that amount which imparts a muddy cast to the dried film, said resin constituting the major proportion of said composition.

2. A process of preparing a coating composition suitable for use as an automobile top renewer which comprises dissolving in a volatile solvent a polyhydric alcohol-polybasic acid resin modified by from 35% to 75% of monobasic acid including linseed oil acids in China wood oil acids, the linseed oil acids being in excess of the China wood oil acids, thoroughly incorporating by mechanical means with said solution carbon black to the amount of ½% to 10% of the resin, an iron drier to the amount of from 5% to 20% of the resin, and an oxide of lead in amount not less than about 1% of the resin calculated as litharge, but less than that amount which imparts a muddy cast to the dried film.

3. A rapid drying composition comprising a solution in organic solvent of a mixture of ingredients consisting essentially of polyhydric alcohol-polybasic acid resin modified with substantial quantity of fatty oil acid, an organic iron drier in amount of from 5% to 20% of the resin, and an oxide of lead in amount not less than about 1% of the resin calculated as litharge but less than that amount which imparts a muddy cast to the dried film, said resin constituting the major proportion of said mixture.

HAROLD S. HOLT.

CERTIFICATE OF CORRECTION.

Patent No. 2,059,948.   November 3, 1936.

HAROLD S. HOLT.

It is hereby certified that error appears in the printed specification of the above numbered patent requiring correction as follows: Page 3, second column, line 3, claim 2, for the word "in" read and; and that the said Letters Patent should be read with this correction therein that the same may conform to the record of the case in the Patent Office.

Signed and sealed this 16th day of February, A. D. 1937.

(Seal)

Henry Van Arsdale
Acting Commissioner of Patents.

which results in a finish free from streaks and brush-marks.

As many apparently different embodiments of this inventon may be made without departing from the spirit and scope thereof, it is to be understood that I do not limit myself to the specific embodiments thereof except as defined in the following claims.

I claim:

1. A composition comprising volatile solvent, an intimate mixture of polyhydric alcohol-polybasic acid resin modified by from 35% to 75% of monobasic acid including linseed oil acids and China wood oil acids with the linseed oil acids in excess of the China wood oil acids, carbon black in amount of from ½% to 10% of the resin, an iron drier in amount of from 5% to 20% of the resin, and an oxide of lead in amount not less than about 1% of the resin calculated as litharge but less than that amount which imparts a muddy cast to the dried film, said resin constituting the major proportion of said composition.

2. A process of preparing a coating composition suitable for use as an automobile top renewer which comprises dissolving in a volatile solvent a polyhydric alcohol-polybasic acid resin modified by from 35% to 75% of monobasic acid including linseed oil acids in China wood oil acids, the linseed oil acids being in excess of the China wood oil acids, thoroughly incorporating by mechanical means with said solution carbon black to the amount of ½% to 10% of the resin, an iron drier to the amount of from 5% to 20% of the resin, and an oxide of lead in amount not less than about 1% of the resin calculated as litharge, but less than that amount which imparts a muddy cast to the dried film.

3. A rapid drying composition comprising a solution in organic solvent of a mixture of ingredients consisting essentially of polyhydric alcohol-polybasic acid resin modified with substantial quantity of fatty oil acid, an organic iron drier in amount of from 5% to 20% of the resin, and an oxide of lead in amount not less than about 1% of the resin calculated as litharge but less than that amount which imparts a muddy cast to the dried film, said resin constituting the major proportion of said mixture.

HAROLD S. HOLT.

---

CERTIFICATE OF CORRECTION.

Patent No. 2,059,948.     November 3, 1936.

HAROLD S. HOLT.

It is hereby certified that error appears in the printed specification of the above numbered patent requiring correction as follows: Page 3, second column, line 3, claim 2, for the word "in" read and; and that the said Letters Patent should be read with this correction therein that the same may conform to the record of the case in the Patent Office.

Signed and sealed this 16th day of February, A. D. 1937.

(Seal)

Henry Van Arsdale
Acting Commissioner of Patents.

CERTIFICATE OF CORRECTION.

Patent No. 2,059,948.  November 3, 1936.

HAROLD S. HOLT.

It is hereby certified that error appears in the printed specification of the above numbered patent requiring correction as follows: Page 3, second column, line 3, claim 2, for the word "in" read and; and that the said Letters Patent should be read with this correction therein that the same may conform to the record of the case in the Patent Office.

Signed and sealed this 16th day of February, A. D. 1937.

(Seal)

Henry Van Arsdale
Acting Commissioner of Patents.